(12) United States Patent
Kageyama

(10) Patent No.: US 10,193,179 B2
(45) Date of Patent: Jan. 29, 2019

(54) FUEL CELL STACK

(71) Applicant: NISSAN MOTOR CO., LTD., Yokohama-shi, Kanagawa (JP)

(72) Inventor: Kazuhiro Kageyama, Kanagawa (JP)

(73) Assignee: NISSAN MOTOR CO., LTD., Yokohama-Shi (JP)

( * ) Notice: Subject to any disclaimer, the term of this patent is extended or adjusted under 35 U.S.C. 154(b) by 0 days.

(21) Appl. No.: 15/765,803

(22) PCT Filed: Oct. 5, 2015

(86) PCT No.: PCT/JP2015/078226
§ 371 (c)(1),
(2) Date: Apr. 5, 2018

(87) PCT Pub. No.: WO2017/060955
PCT Pub. Date: Apr. 13, 2017

(65) Prior Publication Data
US 2018/0301735 A1   Oct. 18, 2018

(51) Int. Cl.
*H01M 8/2485*   (2016.01)
*H01M 8/0202*   (2016.01)
(Continued)

(52) U.S. Cl.
CPC ....... *H01M 8/2485* (2013.01); *H01M 8/0202* (2013.01); *H01M 8/0247* (2013.01); *H01M 8/0273* (2013.01); *H01M 8/0276* (2013.01); *H01M 8/0297* (2013.01); *H01M 8/1004* (2013.01); *H01M 8/242* (2013.01); *H01M 2008/1095* (2013.01)

(58) Field of Classification Search
CPC .................. H01M 8/2485; H01M 8/0247
See application file for complete search history.

(56) References Cited

U.S. PATENT DOCUMENTS

| 2007/0082251 A1 | 4/2007 | Inagaki |
| 2011/0180398 A1 | 7/2011 | Nakazawa et al. |

(Continued)

FOREIGN PATENT DOCUMENTS

| JP | 2005-190706 A | 7/2005 |
| JP | 2010-073622 A | 4/2010 |

(Continued)

*Primary Examiner* — Olatunji A Godo
(74) *Attorney, Agent, or Firm* — Foley & Lardner LLP

(57) ABSTRACT

The fuel cell stack FS includes; a stacked plurality of single cells C each including a frame 1 of a membrane electrode assembly 2 and a pair of separators 3, 4; and a sealing member 6 disposed between the plurality of single cells C. The pair of separators 3, 4 include respective supporting portions 9, 10 that are in contact with the frame 1, and the sealing member 6 is disposed on one supporting member 10. Further, the supporting portions 9, 10 of the separators 3, 4 have different sizes so that an overlapped portion W is formed in which a base surface 7 where the supporting portion 9 of one separator 3 is in contact with the frame 1 is overlapped with a top surface 8 where the supporting portion 10 of the other separator 4 is in contact with the frame 1 in the stacking direction. The overlapped portion W receives and transmits reaction force of the sealing member 6 between the single cells, which prevents narrowing of gas channels or decrease of the sealing surface pressure.

11 Claims, 16 Drawing Sheets

(51) Int. Cl.
   *H01M 8/242*    (2016.01)
   *H01M 8/0297*   (2016.01)
   *H01M 8/0247*   (2016.01)
   *H01M 8/0273*   (2016.01)
   *H01M 8/0276*   (2016.01)
   *H01M 8/1004*   (2016.01)
   *H01M 8/1018*   (2016.01)

(56) References Cited

U.S. PATENT DOCUMENTS

| 2011/0300465 A1 | 12/2011 | Ohta et al. |
| 2012/0156584 A1 | 6/2012 | Uehara |
| 2014/0017593 A1 | 1/2014 | Abe et al. |
| 2015/0050577 A1 | 2/2015 | Numao et al. |
| 2015/0295266 A1 | 10/2015 | Nonoyama |

FOREIGN PATENT DOCUMENTS

| JP | 2010-272474 A | 12/2010 |
| JP | 2011-048970 A | 3/2011 |
| JP | 2014-093168 A | 5/2014 |
| WO | WO 2013/132860 A1 | 9/2013 |

FUEL CELL STACK

TECHNICAL FIELD

The present invention relates to an improvement of a fuel cell stack in which a plurality of single cells is stacked.

BACKGROUND ART

For example, one of fuel cell stacks known in the art is described in Patent Document 1. The fuel cell stack described in Patent Document 1 includes a multicell module that is formed by stacking a plurality of single cells each including a membrane electrode assembly and a pair of separators holding the membrane electrode assembly therebetween. Each of the cells includes a non-power generating area and manifolds that are disposed in the non-power generating area to flow respective fluids of coolant, combustion gas and oxidation gas. In the fuel cell stack, a plurality of multicell modules are arranged in series in the cell stacking direction, and the gaps between the multicell modules are sealed with bead gaskets.

CITATION LIST

Patent Document

Patent Document 1: JP 2005-190706A

SUMMARY OF INVENTION

Technical Problem

In such a fuel cell stack as described above, sealing members are disposed between adjacent cells, around the respective manifolds and the like in order to prevent leakage of fluid to the outside or to the other channels. However, a problem with such a fuel cell stack in the art is that reaction force of the sealing members may bend a separator inward to narrow a gas channel or to decrease the sealing surface pressure of the sealing members, and it has been required to solve the problem.

The present invention has been made in view of the above-described problem in the prior art, and an object thereof is to provide a fuel cell stack that has a structure of receiving reaction force of a sealing member intervened between single cells and that can thereby prevent narrowing of gas channels or decrease of the sealing surface pressure in the single cells.

Solution to Problem

The fuel cell stack of the present invention includes: a stacked plurality of single cells each including a frame supporting the periphery of a membrane electrode assembly and a pair of separators that hold the frame therebetween; and a sealing member disposed between the plurality of single cells. In the fuel cell stack, the pair of separators comprises respective supporting portions which are in contact with the frame, a sealing member is disposed on one of the supporting portions, a supporting portion of one separator has a different size from a supporting portion of the other separator so that an overlapped portion is formed in which a base surface where the supporting portion of one separator is in contact with the frame is overlapped with a top surface where the supporting portion of the other separator is in contact with the frame in the stacking direction, and the overlapped portion receives and transmits reaction force of the sealing member between the single cells.

Advantageous Effects of Invention

With the above-described configuration, the single cells have a structure of receiving reaction force of the sealing members intervened between adjacent single cells. The fuel cell stack of the present invention can therefore prevent narrowing of gas channels or decrease of the sealing surface pressure in the single cells.

DESCRIPTION OF EMBODIMENTS

First Embodiment

Figure 1A:
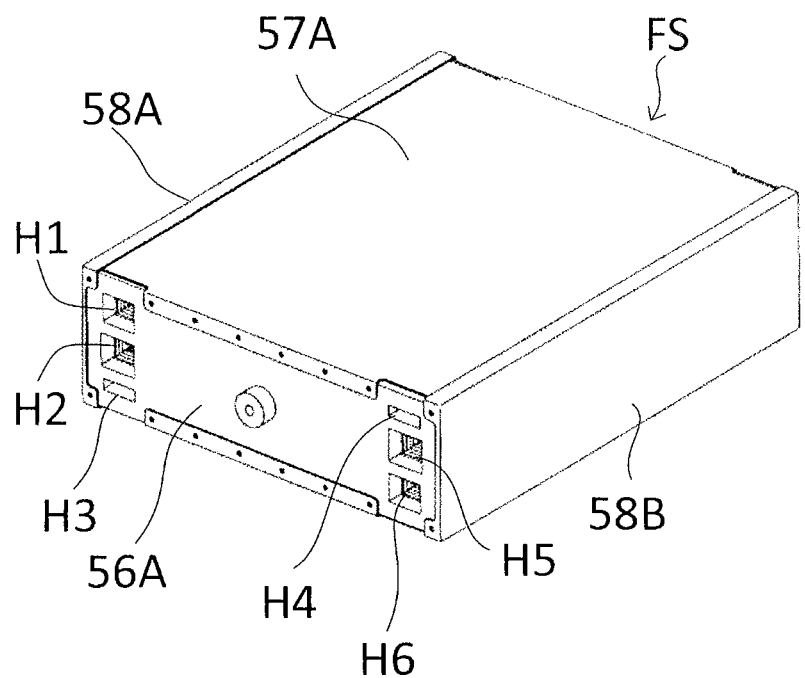
FIG. 1A is a perspective view and FIG. 1. B is a perspective exploded view of a fuel cell stack.
Figure 1B:
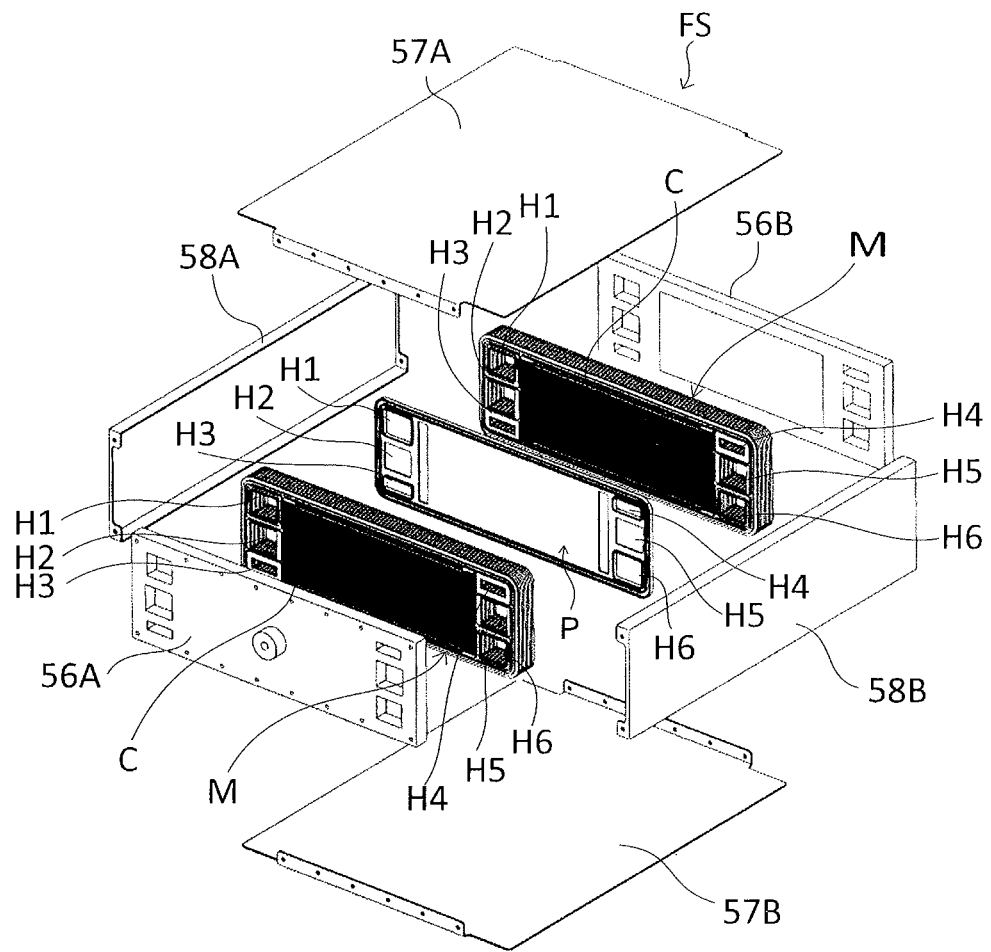

FIG. 1A, FIG. 1B, FIG. 2A, FIG. 2B, FIG. 3A, FIG. 3B, and FIG. 4A to FIG. 4C illustrate a fuel cell stack according to a first embodiment of the present invention. As illustrated particularly in FIG. 1B, the structure of the fuel cell stack FS of FIG. 1A and FIG. 1B is such that a plurality of cell modules M is stacked, each of which is formed by stacking a plurality of single cells C. Further, a sealing plate P is intervened between the cell modules M. The single cells C and the sealing plate P in the figures have a rectangular shape with approximately the same length and width. While FIG. 1B illustrates two cell modules M and one sealing plate P, more cell modules M and sealing plates P are stacked.

The fuel cell stack FS further includes end plates 56A, 56B disposed in the respective ends in the stacking direction of the cell modules M, fastening plates 57A, 57B disposed on the respective faces corresponding to the long sides of the single cells C (top and bottom faces in FIG. 1A and FIG. 1B) and reinforcing plates 58A, 58B disposed on the respective faces corresponding to the shorts sides. The fastening plates 57A, 57B and the reinforcing plates 58A, 58B are each coupled to both end plates 56A, 56B with bolts (not shown).

The fuel cell stack FS thus configured has a case-integrated structure as illustrated in FIG. 1A, which restrains and presses the cell modules M and the sealing plates P in the stacking direction to apply a predetermined contact surface pressure to each of the single cells C, so that the gas sealing property, the electrical conductivity and the like are maintained at high level.

Figure 2A:
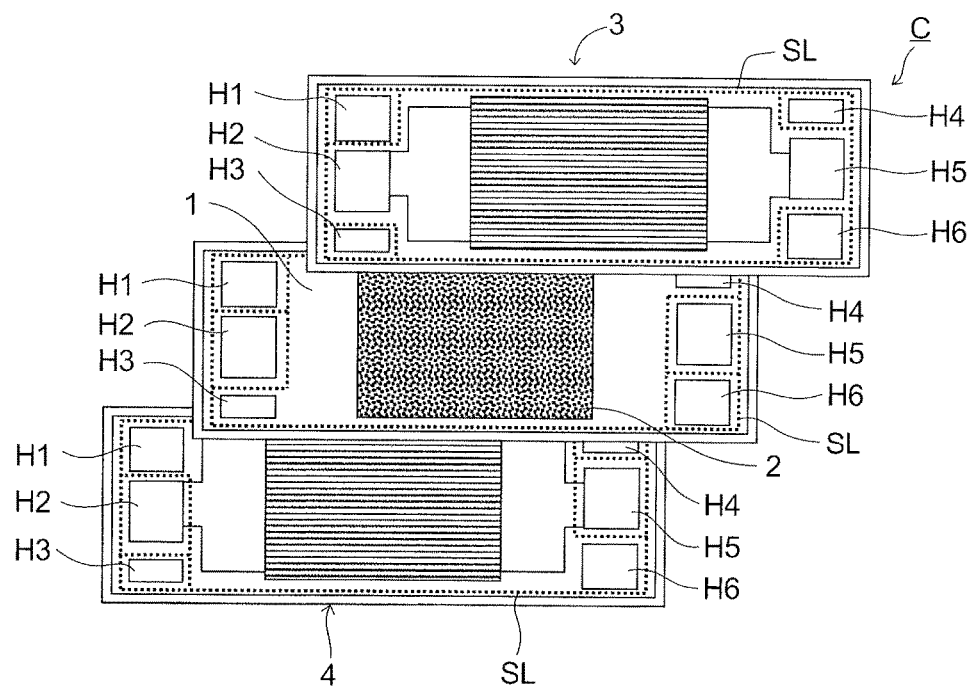
FIG. 2A is a plan view of a disassembled single cell.

As illustrated in FIG. 2A, each of the single cells C includes a frame 1 supporting the periphery of a membrane electrode assembly 2 and a pair of separators 3, 4 holding the frame 1 and the membrane electrode assembly 2 therebetween. In the single cell C, a gas channel for anode gas (hydrogen-containing gas) is formed between the frame 1 or the membrane electrode assembly 2 and one separator 3, and a gas channel for cathode gas (oxygen-containing gas, e.g. air) is formed between the frame 1 or the membrane electrode assembly 2 and the other separator 4.

The frame 1 is constituted by a thin film member, e.g. a resin film, which is integrated with the membrane electrode assembly 2 disposed in the center of the frame 1. The structure of the membrane electrode assembly 2, which is generally referred to as an MEA, is such that an electrolyte layer of a solid polymer is intervened between an anode electrode layer and a cathode electrode layer although the detailed structure is not shown in the figure.

For example, the separators 3, 4, which are made of stainless steel, are formed in a suitable shape, for example, by press molding and have an uneven cross-sectional shape that continuously extends in the longitudinal direction at least in the portions corresponding to the membrane electrode assembly 1. In the portions having the uneven cross-sectional shape, the tips of the corrugation of the separators 3, 4 are in contact with the membrane electrode assembly 1 while the recesses of the corrugation form the gas channels that extend in the longitudinal direction between the separators 3, 4 and the membrane electrode assembly 1.

Figure 2B:
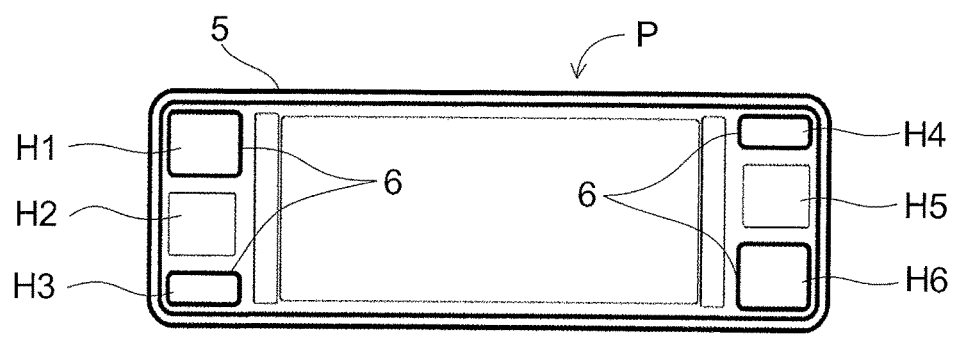
FIG. 2B is a plan view of a sealing plate.

As illustrated in FIG. 2B, each of the sealing plates P is constituted by an electrically-conductive metal plate that is formed in a predetermined shape, and can carry current stably over time. The sealing plate P includes a peripheral sealing member 5 that continuously extends along the outer edge to form a channel for cooling fluid (e.g. water) between the sealing plate P and the cell modules M. In other words, in the fuel cell stack FS, the channels for the cooling fluid are formed between the cell modules M, and the sealing plates P are disposed in the channels. Further, in the fuel cell stack FS, channels for the cooling fluid are also formed between the single cells C.

The peripheral sealing member 5 is provided to prevent rain water and the like from penetrating from the outside and to prevent leakage of the cooling fluid. In the example illustrated in FIG. 3A and FIG. 3B, a double structure composed of an outer sealing member 5A and an inner sealing member 5B further increases the sealing property.

Figure 3A:
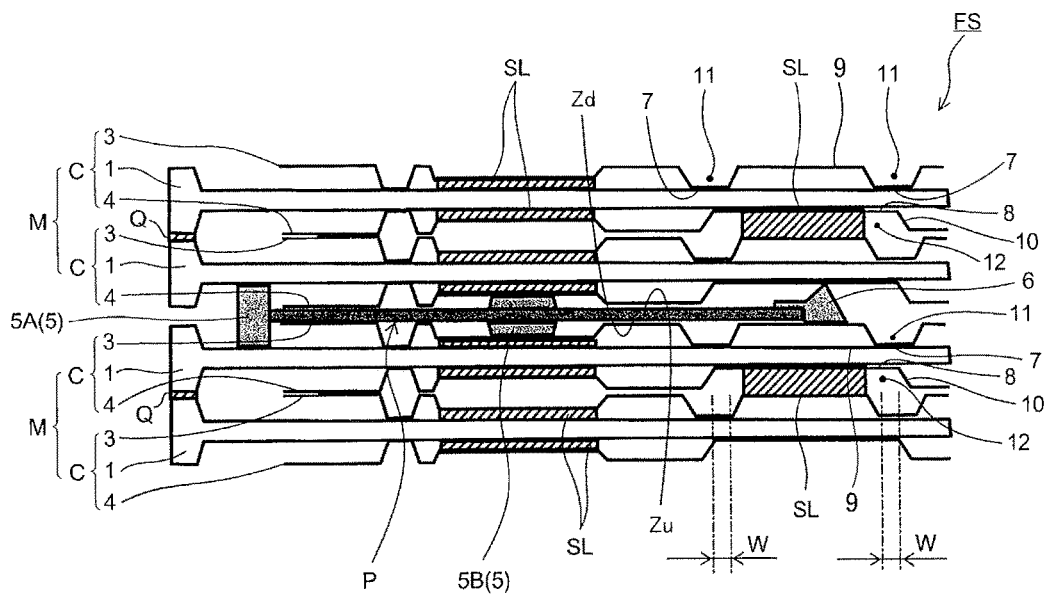
FIG. 3A is a cross-sectional view of the main part of a fuel cell stack according to a first embodiment of the present invention.
Figure 3B:
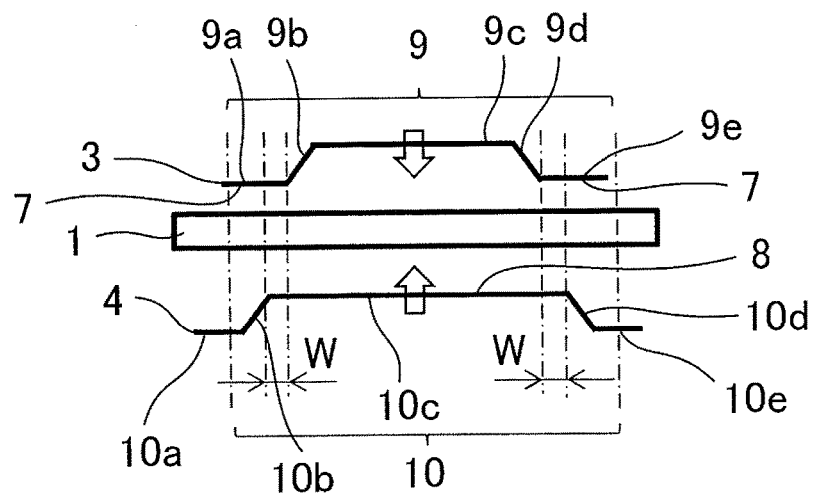
FIG. 3B is a cross-sectional exploded view for illustrating a supporting portion.

As illustrated in FIG. 3A and FIG. 3B, each of the frames 1 is slightly larger than the separators 3, 4 and the sealing plates P. The externally projected outer edge portions are bonded to each other (reference signs Q) so as to prevent a leakage of fluid to the outside and to prevent a short circuit between the single cells.

As illustrated in FIG. 2A and FIG. 2B, the frame 1 and the separators 3, 4 of each of the single cells C and the sealing plates P respectively have manifold holes H1 to H6 that communicate with each other in the stacked state to form manifolds for fluids. In the illustrated example, three manifold holes, namely manifold holes H1 to H3 and H4 to H6, are respectively arranged along each short side of the single cell C.

For example, the manifold holes H1 to H3 on the left in FIG. 2A and FIG. 2B are configured respectively to supply the cathode gas (H1), to supply cooling fluid (H2) and to discharge the anode gas (H3) from the top. The manifold holes H4 to H6 on the right in FIG. 2A and FIG. 2B are configured respectively to supply the anode gas (H4), to discharge the cooling fluid (H5) and to discharge the cathode gas (H6) from the top. The positional relationship of the manifold holes H1 to H6 may be partly or fully reversed in respect of supply and discharge.

As illustrated by dotted lines in FIG. 2A, the frame 1 and the separators 3, 4 of each of the single cell C include sealing lines SL that are disposed along the outer periphery and around the manifold holes H1 to H6 to serve as sealing members. The sealing lines SL, which are adhesive, are provided to bond the frame 1 to the separators 3, 4 as well as to prevent a leakage of the fluids such as gas and cooling liquid to the outside and to prevent a leakage of the fluids into other channels. For this purpose, the sealing lines SL disposed around the manifold holes H1 to H6 are partly open as an inlet/outlet so that corresponding fluids can flow in the channels.

As illustrated in FIG. 2B, each of the sealing plates P includes manifold sealing members 6 that seal the area around the manifold holes H1, H6 for the cathode gas and the manifold holes H3, H4 for the anode gas. In the illustrated example, no sealing member is disposed around the manifold holes H2, H5 for the cooling fluid since the sealing plate P is disposed between the cell modules M, i.e. in the channel for the cooling fluid, as described above. As illustrated in FIG. 3A, the sealing plate P further includes supporting surfaces Zd, Zu that abut supporting portions (9, 10) (described later) of the separators (3, 4) to transmit a force from the supporting portions (9, 10) of the separators (3, 4).

In the above-described fuel cell stack FS, sealing members are disposed between the stacked plurality of single cells C. Particularly in the embodiment, the sealing plates P are intervened between the single cells C, which include the sealing lines SL as sealing members and the peripheral sealing members 5 and the manifold sealing members 6 also as sealing members.

In the above-described fuel cell stack FS, the sealing lines SL bond the frames 1 to the separators 3, 4 to ensure the gas sealing property. In contrast, the manifold sealing members 6 are specialized for a sealing function and are provided to ensure a predetermined sealing surface pressure. For this purpose, the manifold sealing members 6 are made of a material that produces stronger repulsion force than the sealing lines SL. Therefore, reaction force of the manifold sealing members 6 may mainly acts on the separators 3, 4 to bend them toward the inside of the single cells C and thus to narrow the gas channels or to decrease the sealing surface pressure of the manifold sealing members 6. To prevent this, the fuel cell stack FS has the following configuration.

That is, in the fuel cell stack FS, the pair of separators 3, 4 includes respective supporting portions 9, 10 that are in contact with the frame 1 as illustrated in FIG. 3A, FIG. 3B and FIG. 4A to FIG. 4C. In the fuel cell stack FS, sealing members (the sealing lines SL and the manifold sealing members 6) are disposed on one of the supporting portions 9, 10, specifically the supporting portions 10. Furthermore, the supporting portions 9 of one separator 3 has a different size from the supporting portions 10 of the other separator 4 so that overlapped portions W are formed in which base surfaces 7 where the supporting portions 9 of one separator 3 are in contact with the frame 1 are overlapped with top surfaces 8 where the supporting portions 10 of the other separator 4 are in contact with the frame 1 in the stacking direction. The fuel cell stack FS is thus configured to receive and transmit reaction force of the sealing members (particularly the manifold sealing members 6) between the single cells by means of the overlapped portions W.

In the embodiment, each of the supporting portions 9 of one separator 3 includes a horizontal part 9a, an ascending slope 9b, a horizontal part 9c, a descending slope 9d and a horizontal part 9e as illustrated in FIG. 3B in the written order from the left. The undersurfaces (in the figure) of the horizontal parts 9a, 9e at the respective ends serve as base surfaces 7 that are in contact with the frame 1. Each of the supporting portions 10 of the other separator 4 includes a horizontal part 10a, an ascending slope 10b, a horizontal part 10c, a descending slope 10d and a horizontal part 10e in the written order from the left in the figure. The upper surface (in the figure) of the center horizontal part 10 serves as a top surface 8.

Particularly in the embodiment, the center horizontal faces 9c, 10c of the supporting portions 9, 10 of the respective separators 3, 4 have relatively different lengths so that the supporting portions 9, 10 have different sizes. As a result, two overlapped portions W are formed between the base surfaces 7 and the top surface 8. The above-described names such as horizontal part, slope, base surface and top surface are used only for descriptive reasons or ease of understanding, and it is not intended to specify the direction of corresponding members in the fuel cell stack FS.

The separators 3, 4 of the embodiment have front and back faces with mutually reversed shapes, and recesses 11, 12 are formed in the back sides (inner sides) of the supporting portions 9, 10. The separators 3, 4 are each formed from a single sheet material by press molding. As illustrated in FIG. 3A, the sealing members 6, SL are disposed between adjacent single cells C, C, specifically between the supporting portions 10 of the separator 4 (lower separator in the figure) of a single cell C and the top surfaces 8 of the supporting portions 9 of the separator 3 (upper separator in the figure) of another single cell C. In particular, the sealing members 6, SL are disposed in the recesses 12 of the separator 4 (lower separator in the figure) of a single cell C, which are the back sides of the supporting portions 10.

Figure 4A:
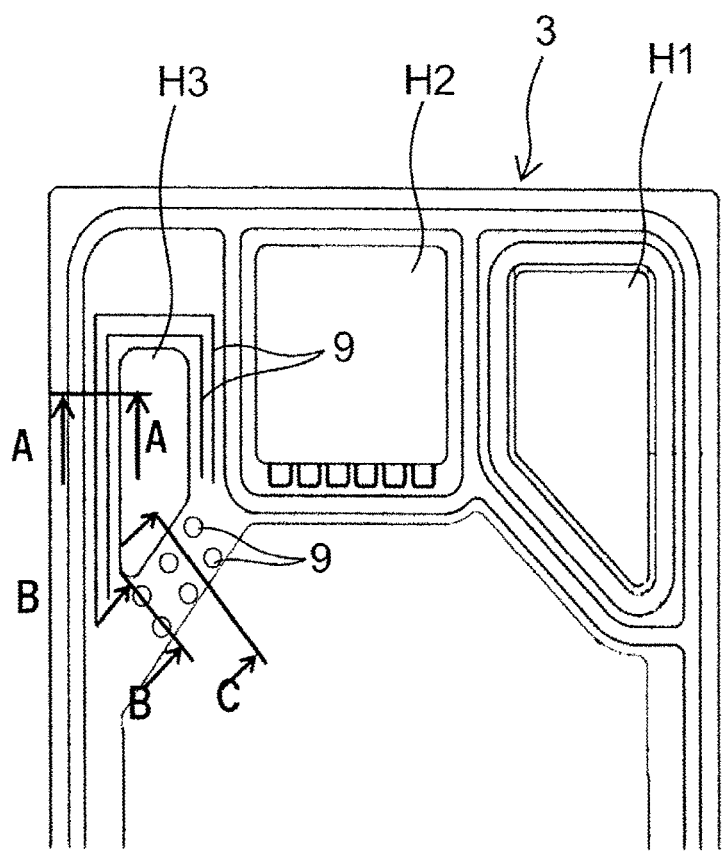
FIG. 4A is a plan view of the main part of a separator in FIG. 3A and FIG. 3B.

The supporting portions 9 (10) are formed along the periphery of the manifold holes H1 to H6 of the separator 3 (4) as illustrated in FIG. 4A. As the sealing lines SL of the manifold holes H1 to H6 are partly open to form inlets/outlets for fluid as described above, the supporting portions 9 (10) are formed around the manifold holes H1 to H6 continuously (in a rib shape) in the part other than the inlets/outlets but intermittently (in an embossed shape) in the inlet/outlet parts.

Figure 4B:
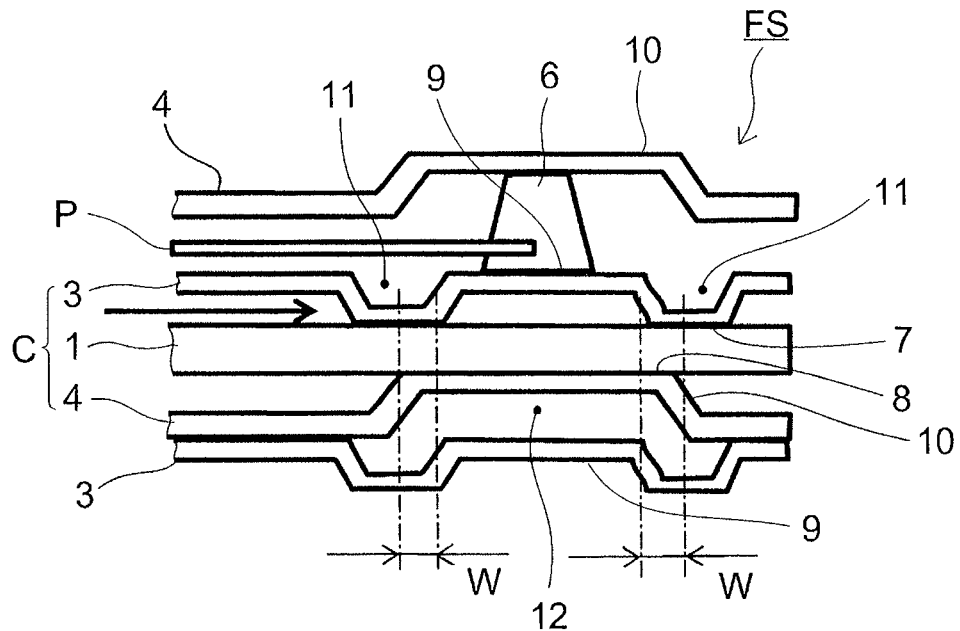
FIG. 4B is a cross-sectional view taken along the line A-A and the line B-B in FIG. 4A.
Figure 4C:
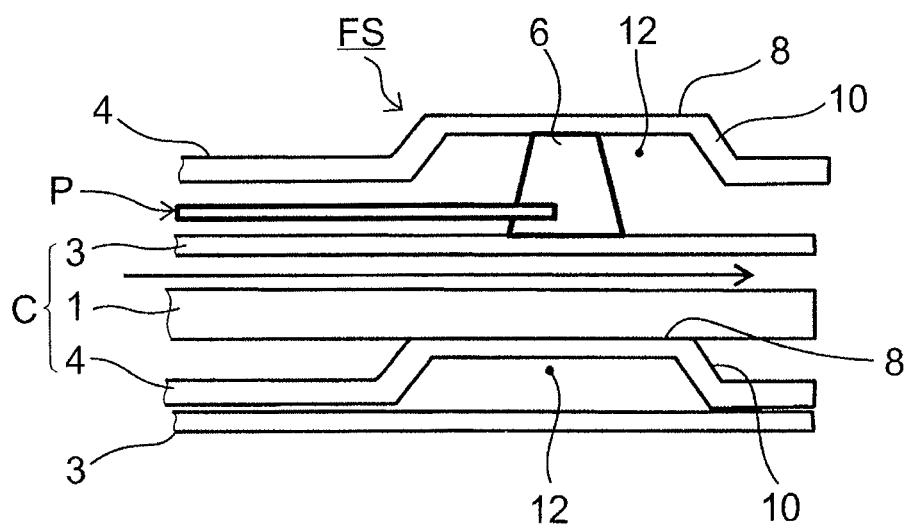
FIG. 4C is a cross-sectional view taken along the line C-C in FIG. 4A.

As illustrated by the arrow in FIG. 4B, the supporting portions 9 (10) block gas flow in the continuous parts of the supporting portions 9 (10) as indicated by the line A-A and the intermittent parts of the supporting portion 9 (10) as indicated by the line B-B in FIG. 4A. In contrast, as illustrated by the arrow in FIG. 4C, gas flows well through the gaps in the intermittent parts of the supporting portions 9 (10) as indicated by the line C-C in FIG. 4A.

The manifold holes H1 to H6 of the separators 3 (4) in FIG. 4A have a different shape from those in FIG. 2A and FIG. 2B, but they have substantially the same function. Similarly, the manifold sealing members 6 in FIG. 4B and FIG. 4C have a different shape from those in FIG. 3A and FIG. 3B, but they have substantially the same function.

Since the separators 3, 4 of the embodiment have front and back faces with mutually reversed shapes, the supporting portions 9, 10 are formed in a rib shape in the parts other than the inlets/outlets of the manifold holes H1, H3 while the groove recesses 11, 12 are formed on the back sides thereof. Similarly, in the inlets/outlets of the manifold holes H1, H3, the supporting portions 9, 10 are formed in an embossed shape while the recesses 11, 12 are formed in a dimple shape on the back sides thereof.

In the fuel cell stack FS with the above-described configuration, electric power is generated by electrochemical reaction when the anode gas and the cathode gas are supplied to the single cells C. Along with the power generation, the cooling fluid is supplied to the gaps between the single cells C and the gaps between the cell modules M so as to cool the whole system.

In the above-described fuel cell stack FS, the supporting portions 9 of one separator 3 have a different size from the supporting portions 10 of the other separator 4. This forms the overlapped portions W in which the base surfaces 7 where the supporting portions 9 of one separator 3 are in contact with the frames 1 are overlapped with the top surfaces 8 where the supporting portions 10 of the other separator 4 are in contact with the frames 1 in the stacking direction. In the fuel cell stack FS, this configuration allows the overlapped portions W to receive and transmit reaction force of the sealing members (particularly the manifold sealing members 6) between the single cells C, C, which can prevent narrowing of the gas channels or decrease of the sealing surface pressure in the single cells.

Even when the sealing lines SL and the manifold sealing members 6 have different structure and produce different repulsion force as described above, the overlapped portions W can receive and transmit the reaction force of the sealing members (6, SL) between the single cells C, C so as to prevent narrowing of the gas channels or decrease of the sealing surface pressure in the single cells C regardless of the difference in the repulsion force.

In the above-described fuel cell stack FS, the frame 1 and the pair of separators 3, 4 of each single cell C respectively have the manifold holes H1 to H6 that communicate with each other in the stacked state, and the sealing members seal the periphery of the manifold holes H1 to H6 (i.e. the manifold sealing members 6) as well as the gaps between the single cells. In the fuel cell stack FS, this can particularly prevent narrowing of the gas channels or decrease of the sealing surface pressure particularly around the manifold holes H1 to H6 so as to improve the gas flowability and gas sealing property.

In the above-described fuel cell stack FS, both of the separators 3, 4 have front and back faces with mutually reversed shapes, and the recesses 11, 12 are formed on the back sides of the supporting portions 9, 10. For example, this enables readily forming the supporting portions 9, 10 and the recesses 11, 12 simultaneously by press molding and facilitates mass production.

In the fuel cell stack FS, since the supporting portions 9, 10 are provided in the separators 3, 4, it is possible to employ a thin film member, specifically a flat film as the frames 1. By such film frames 1, the thinner single cells C can be achieved. Therefore, in the fuel cell stack FS, a reduction in thickness, size and weight of the single cells C and the fuel cell stack FS is achieved by employing the film frames 1 while it has the structure of receiving reaction force of the sealing members.

The fuel cell stack FS includes the plurality of cell modules M each composed of the stacked plurality of single cells C, wherein the sealing plates P including the manifold sealing members 6 are intervened between the cell modules M. The structure of receiving reaction force of the manifold sealing members 6 can prevent narrowing of the gas channels or decrease of the sealing surface pressure in the single cells C. This can improve the gas flowability and the gas sealing property around the manifold holes H1 to H6.

FIG. 5, FIG. 6A to FIG. 6D, FIG. 7A to FIG. 7D and FIG. 8A to FIG. 8D illustrate fuel cell stacks according to second to seventh embodiments of the present invention. In the following embodiments, the same reference signs are denoted to the same components as those of the first embodiment, and the detailed description thereof is omitted. The fuel cell stacks and the single cells have the same basic structure as illustrated in FIG. 1A and FIG. 1B and FIG. 2A. Further, FIG. 5, FIG. 6A to FIG. 6D and FIG. 7A to FIG. 7D are cross-sectional views of the main part taken along the line A-A, the line B-B and the line C-C in FIG. 4A.

Second Embodiment

Figure 5:
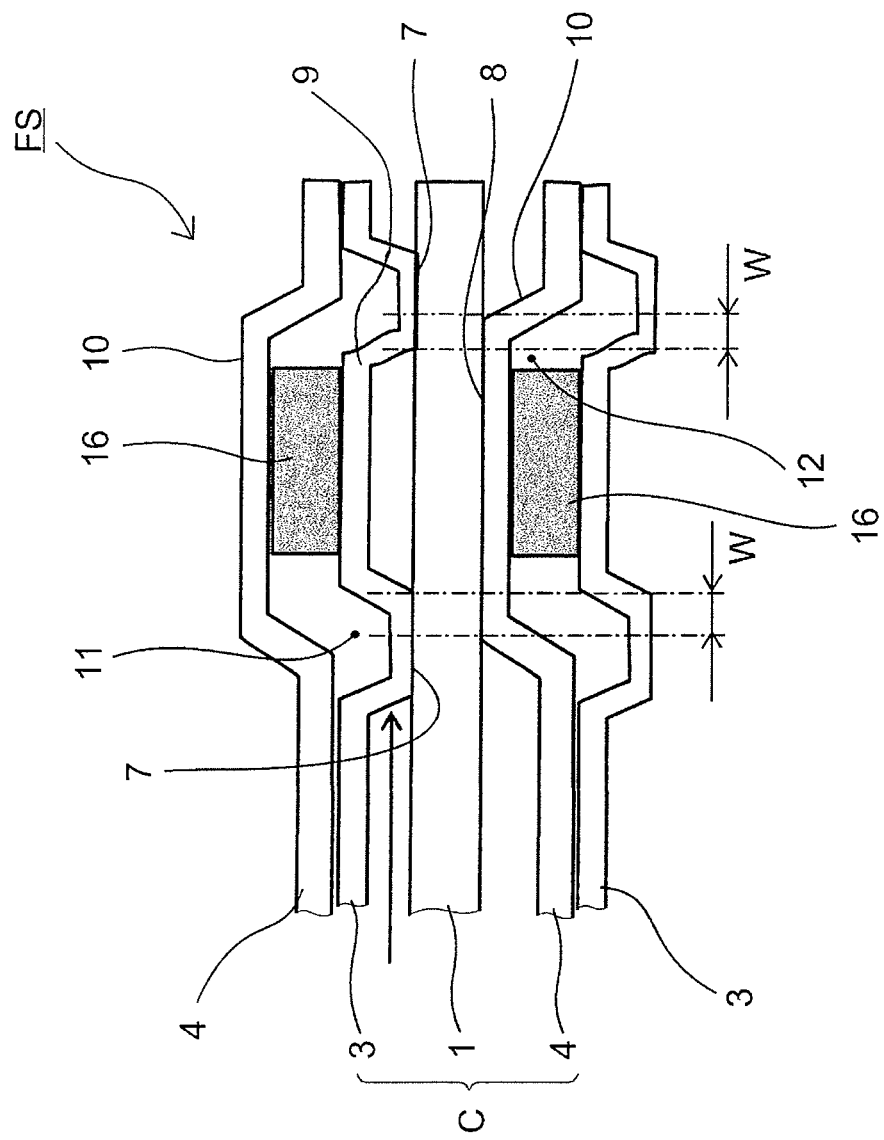
FIG. 5 is a cross-sectional view of the main part of a fuel cell stack according to a second embodiment of the present invention.

The fuel cell stack FS in FIG. 5 is configured not to include the sealing plates (P) described in the previous first embodiment but to include manifold sealing members 16 as the sealing members between single cells C. The manifold sealing members 16 can be disposed instead of the sealing lines SL (see FIG. 2A and FIG. 2B). FIG. 5 is a cross-sectional view taken along the line A-A or the line B-B in FIG. 4A.

That is, in the fuel cell stack FS, the manifold sealing members 16 are intervened between adjacent single cells C specifically between supporting portions 10 of a separator 4 (upper separator in the figure) and supporting portions 9 of a separator 3 (lower separator in the figure). Since the separators 3, 4 have front and back faces with mutually reversed shapes, recesses 11, 12 are formed on the back sides (inner sides) of the supporting portions 9, 10. In the fuel cell stack FS, base surfaces 7 of a supporting portion 9 of one separator 3 of each single cell C are overlapped with the top surface 8 of a supporting portion 10 of the other separator 4 in the stacking direction to form two overlapped portions W.

In the fuel cell stack FS, frames 1 are held between the supporting portions 9, 10 and the overlapped portions W thereof as with the previous embodiment. This structure of reliably receiving reaction force of the manifold sealing members 16 can provide an even better function of preventing narrowing of the gas channels or decrease of the sealing surface pressure.

Third Embodiment

Figure 6A:
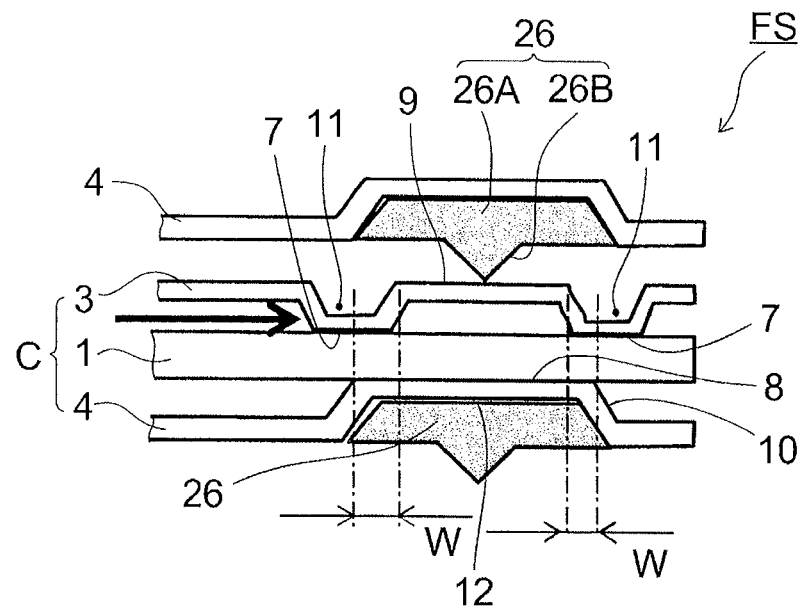
FIG. 6A and FIG. 6B are cross-sectional views of the main part of a fuel cell stack according to a third embodiment of the present invention.
Figure 6B:
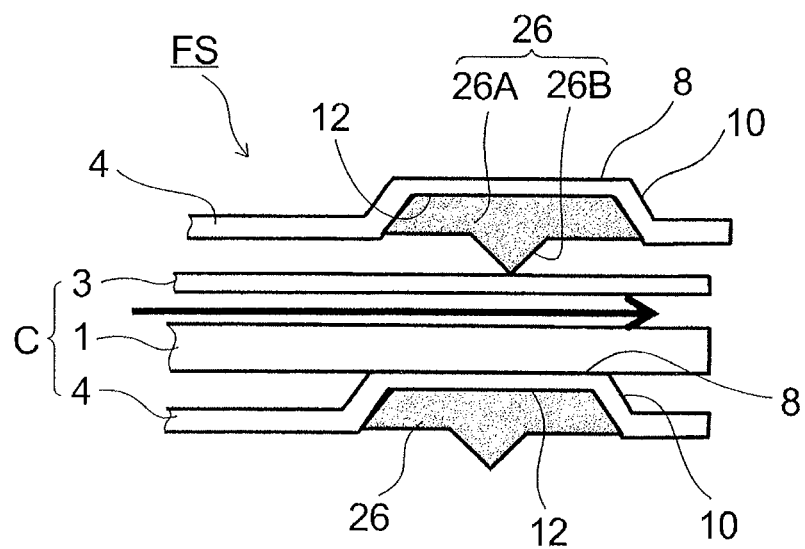

As with the second embodiment, the fuel cell stack FS of FIG. 6A and FIG. 6B is configured such that manifold sealing members 26 are intervened between single cells C. FIG. 6A is a cross-sectional view taken along the line A-A or the line B-B in FIG. 4A, and FIG. 6B is a cross-sectional view taken along the line C-C in FIG. 4A. The arrows in the figure show gas flow.

In the third embodiment, the manifold sealing members 26 are fitted in recesses 12 of the other separator 4 (lower separator in the figure) of each single cell C. Each of the manifold sealing members 26 includes a main body 26A having a cross section corresponding to the recess 12 and a lip 26B disposed at the center of the main body 26A. The lip 26B is in pressure contact with a supporting portion 9 of one separator 3 (upper separator in the figure) of the adjacent single cell C.

In the above-described fuel cell stack FS, frames 1 are held between the supporting portions 9, 10 and overlapped portions W as with the previous embodiments, and the structure receives reaction force of the manifold sealing members 26 more reliably. In the fuel cell stack FS, this can provide an even better function of preventing narrowing of the gas channels or decrease of the sealing surface pressure, and it is therefore possible to employ a film (thin film members) as the frames 1, which is advantageous for reducing the thickness of the single cells C. Further, fitting the manifold sealing members 26 in the recesses 12 facilitates disposing and molding the manifold sealing members 26.

Fourth Embodiment

Figure 6C:
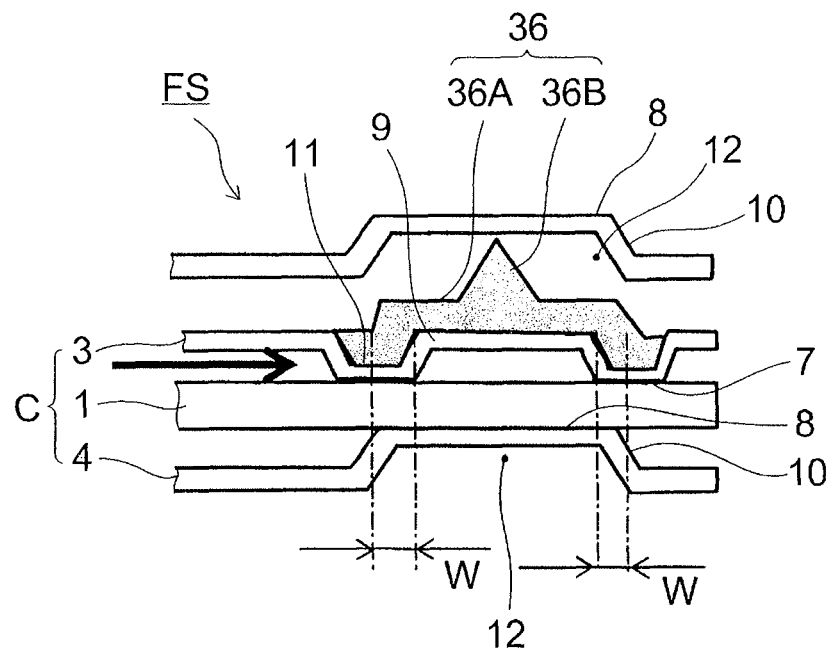
FIG. 6C and FIG. 6D are cross-sectional views of the main part of a fuel cell stack according to a fourth embodiment of the present invention.
Figure 6D:
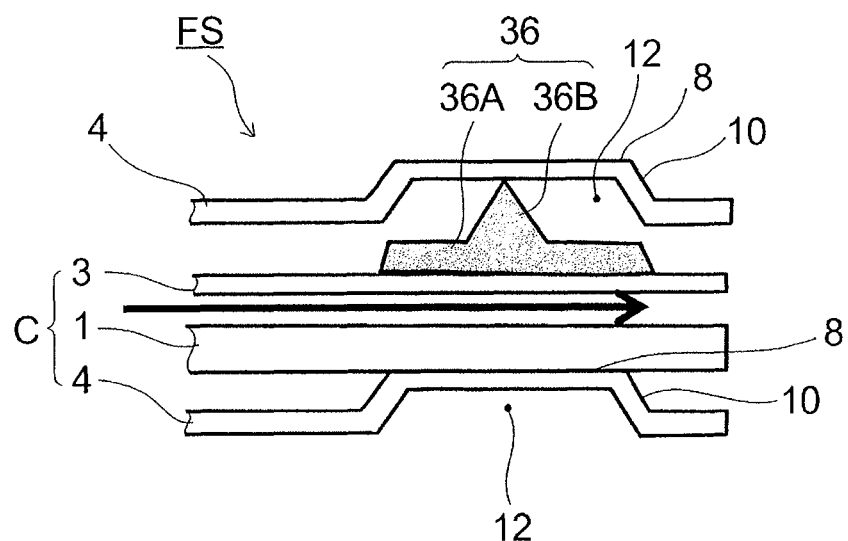

As with the third embodiment, the fuel cell stack FS of FIG. 6C and FIG. 6D is configured such that manifold sealing members 36 are intervened between single cells C. FIG. 6C is a cross-sectional view taken along the line A-A or the line B-B in FIG. 4A, and FIG. 6D is a cross-sectional view taken along the line C-C in FIG. 4C. The arrows in the figure show gas flow.

In the fourth embodiment, the manifold sealing members 36 are disposed in recesses 11 of one separator 3 (upper separator in the figure) of each single cell C. Each of the manifold sealing members 36 includes a main body 36A having a cross section corresponding to the recesses 11 and the part between them, and a lip 36B disposed at the center of the main body 36A. The lip 36B is in pressure contact with a supporting portion 10 of the other separator 4 (lower separator in the figure) of the adjacent single cell C.

In the above-described fuel cell stack FS, frames 1 are held between the supporting portions 9, 10 and overlapped portions W as with the previous embodiments, and the structure receives reaction force of the manifold sealing members 36 more reliably. In the fuel cell stack FS, this can provide an even better function of preventing narrowing of the gas channels or decrease of the sealing surface pressure, and it is therefore possible to employ a film (thin film members) as the frames 1, which is advantageous for reducing the thickness of the single cells C. Further, disposing the manifold sealing members 36 in the recesses 11 facilitates disposing and molding the manifold sealing members 36.

Fifth Embodiment

Figure 7A:
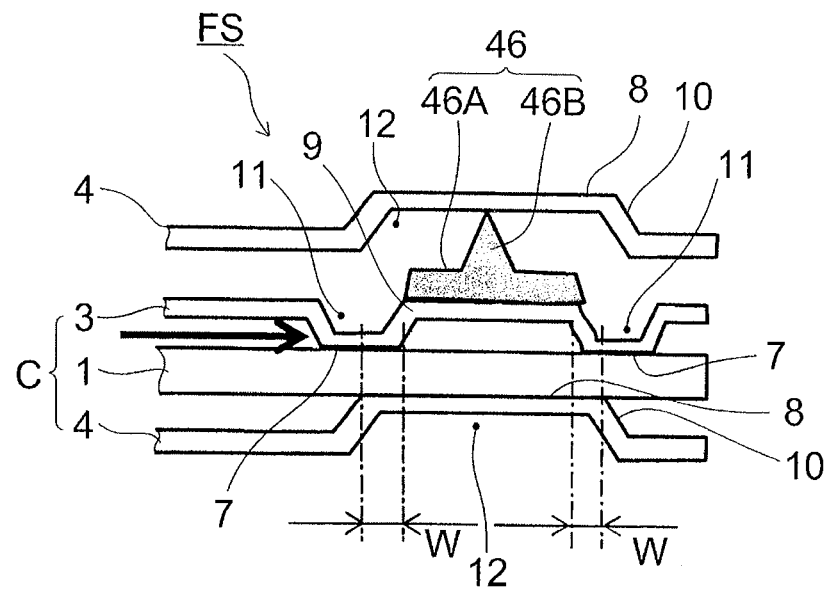
FIG. 7A and FIG. 7B are cross-sectional views of the main part of a fuel cell stack according to a fifth embodiment of the present invention.
Figure 7B:
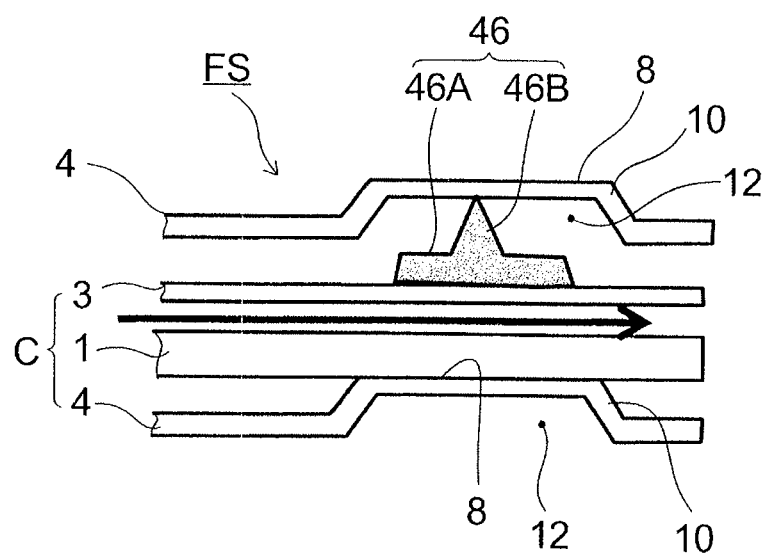

As with the third embodiment, the fuel cell stack FS of FIG. 7A and FIG. 7B is configured such that manifold sealing members 46 are intervened between single cells C. FIG. 7A is a cross-sectional view taken along the line A-A or the line B-B in FIG. 4A, and FIG. 7B is a cross-sectional view taken along the line C-C in FIG. 4C. The arrows in the figure show gas flow.

In the fifth embodiment, the manifold sealing members 46 are disposed on supporting portions 9 of one separator 3 (upper separator in the figure) of each single cell C. Each of the manifold sealing members 46 includes a main body 46A corresponding to the center part of a supporting portion 9 and a lip 46B disposed at the center of the main body 46A. The lip 46B is in pressure contact with a supporting portion 10 of the other separator 4 (lower separator in the figure) of the adjacent single cell C.

In the above-described fuel cell stack FS, frames 1 are held between the supporting portions 9, 10 and overlapped portions W as with the previous embodiments, and the structure receives reaction force of the manifold sealing members 46 more reliably. In the fuel cell stack FS, this can provide an even better function of preventing narrowing of the gas channels or decrease of the sealing surface pressure.

Sixth Embodiment

Figure 7C:
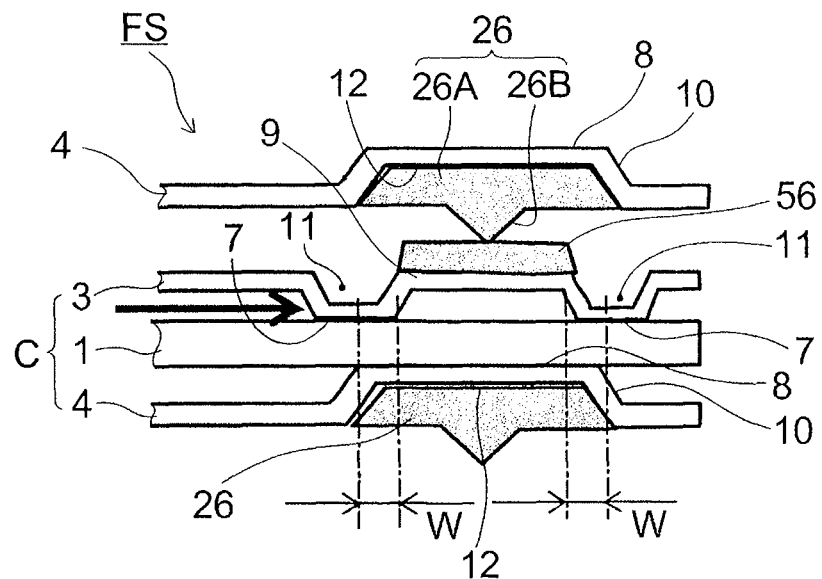
FIG. 7C and FIG. 7D are cross-sectional views of the main part of a fuel cell stack according to a sixth embodiment of the present invention.
Figure 7D:
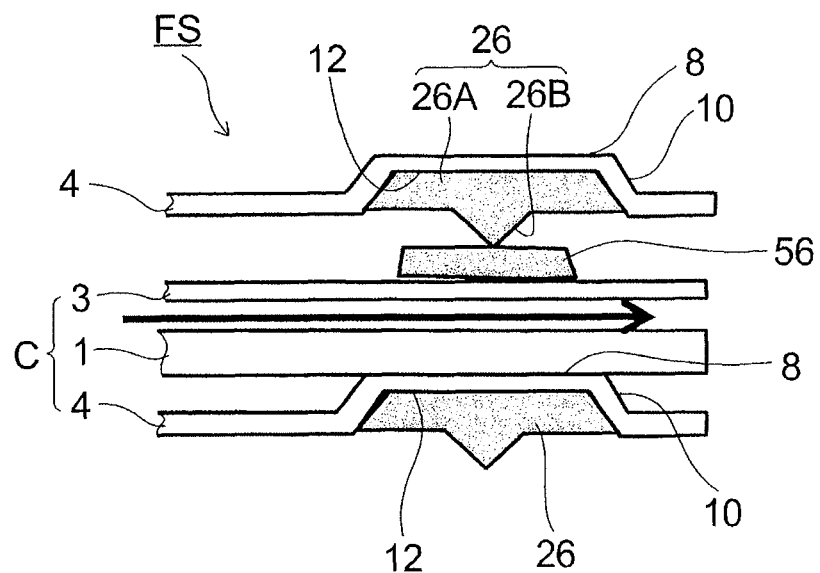

As with the third embodiment, the fuel cell stack FS of FIG. 7C and FIG. 7D is configured such that first and second manifold sealing members 26, 56 are intervened between single cells C. FIG. 7C is a cross-sectional view taken along the line A-A or the line B-B in FIG. 4A, and FIG. 7C is a cross-sectional view taken along the line C-C in FIG. 4C. The arrows in the figure show gas flow.

In the sixth embodiment, the first manifold sealing members 26 are disposed on supporting portions 10 of the other separator 4 (lower separator in the figure) of each single cell C while the second manifold sealing members 56 are disposed on supporting portions 9 of one separator 3 (upper separator in the figure). Each of the first manifold sealing members 26 includes a main body 26A corresponding to a supporting portion 10 and a lip 26B disposed at the center of the main body 26A. The lip 26B is in pressure contact with a second manifold sealing member 56.

In the above-described fuel cell stack FS, frames 1 are held between the supporting portions 9, 10 and overlapped portions W as with the previous embodiments, and this structure receives reaction force of the manifold sealing members 26, 56 more reliably. In the fuel cell stack FS, this structure can provide an even better function of preventing narrowing of the gas channels or decrease of the sealing surface pressure. Further, disposing the manifold sealing members 26 in recesses 12 facilitates disposing and molding the manifold sealing members 26.

Seventh Embodiment

Figure 8A:
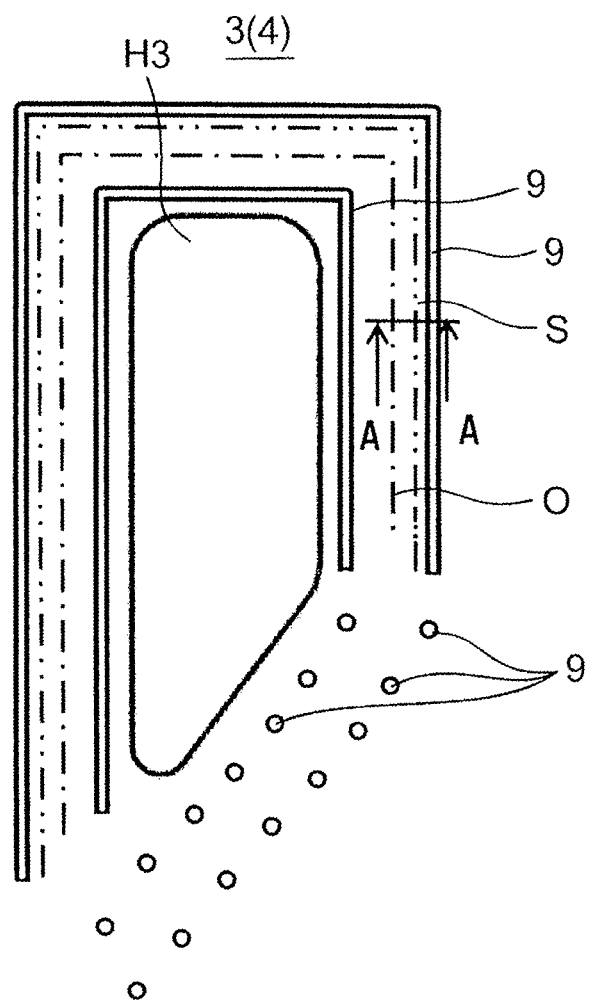
FIG. 8A is a cross-sectional view of the main part of a fuel cell stack according to a seventh embodiment of the present invention.
Figure 8B:
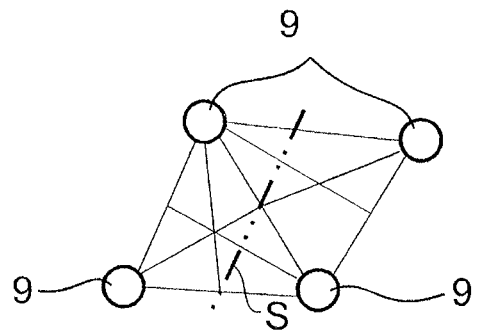
FIG. 8B is a plan view illustrating the arrangement of supporting portions.
Figure 8C:
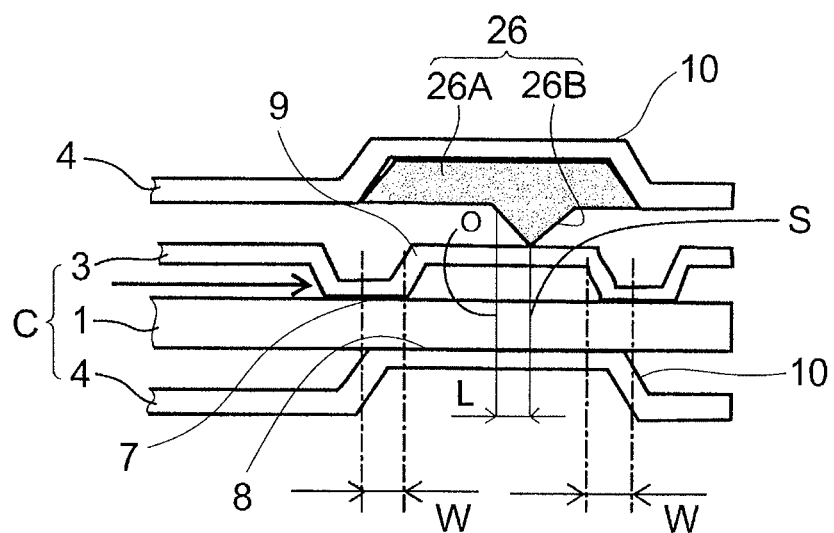
FIG. 8C and FIG. 8D are cross-sectional views taken along the line A-A in (A) illustrating two examples of the arrangement of sealing members.
Figure 8D:
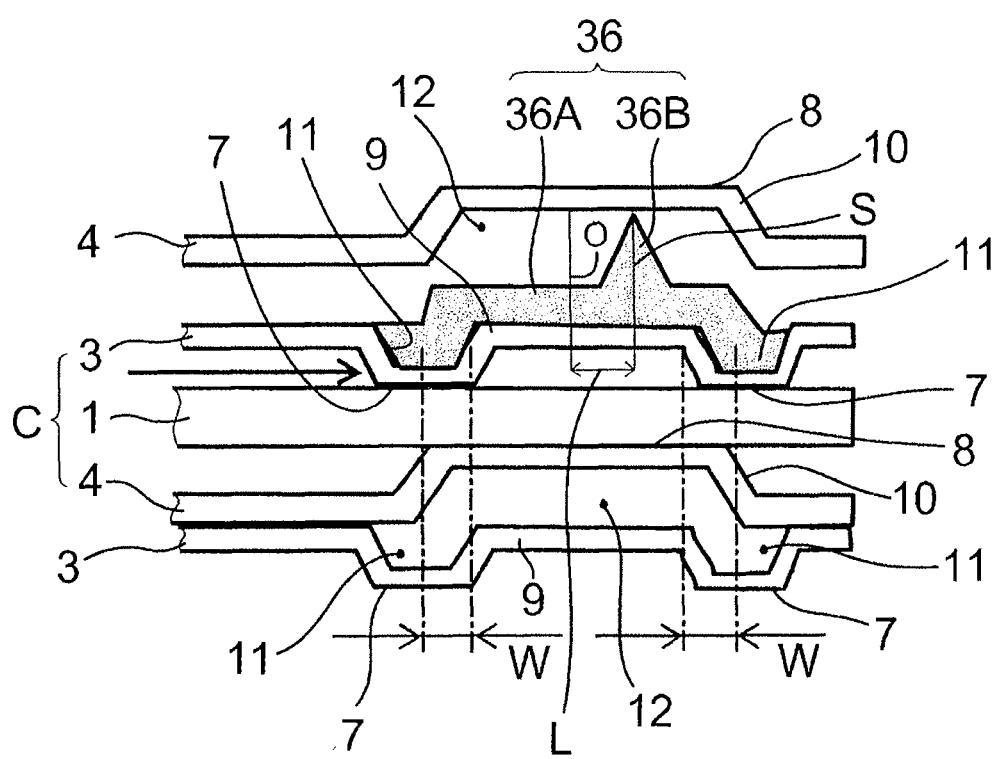

The fuel cell stack FS of FIG. 8A to FIG. 8D is configured such that manifold sealing members 26, 36 are intervened between single cells C. FIG. 8A is a plan view of a manifold hole of a separator, FIG. 8B is a plan view of an embossed supporting portion disposed in an inlet/outlet of a manifold hole, FIG. 8C and FIG. 8D are cross-sectional views taken along the line A-A in (A). The arrows in the figure show gas flow.

As with the third embodiment (see FIG. 6A and FIG. 6B), the fuel cell stack FS of FIG. 8C is configured such that manifold sealing members 26 are disposed on supporting portions 10 of the other separator 4 (lower separator in the figure) of each single cell C. Further, in the fuel cell stack FS, lips 26B of the manifold sealing members 26 are in pressure contact with supporting portions 9 of one separator 3 (upper separator in the figure) of the adjacent single cell C.

As with the fourth embodiment (see FIG. 6C and FIG. 6D), the fuel cell stack of FIG. 8D is configured such that manifold sealing members 36 are disposed on the supporting portions 9 of one separator 3 (upper separator in the figure) of each single cell C. In the fuel cell stack FS, lips 36B of the manifold sealing members 36 are in pressure contact with the supporting portions 10 of the other separator 4 (lower separator in the figure) of the adjacent single cell C.

Compared to the configurations of the third embodiment and the fourth embodiment, the lips 26B, 36B of the manifold sealing members 26, 36 are displaced toward either side by a distance L in the fuel cell stack FS of FIG. 8C and FIG. 8D. That is, in FIG. 8A, the lips 26, 36 are displaced to the position S indicated by the dashed-two dotted line from the center O of the supporting portions 9 (supporting portions 10) indicated by the dashed-dotted line. The position S is deviated from the center of gravity of the embossed supporting portions 9 (10) as illustrated in FIG. 8B.

In the above-described fuel cell stack FS, frames 1 are held between the supporting portions 9, 10 and overlapped portions W as with the previous embodiments, and the structure receives reaction force of the manifold sealing members 26 more reliably. In the fuel cell stack FS, this can provide an even better function of preventing narrowing of the gas channels or decrease of the sealing surface pressure.

Further, disposing the manifold sealing members 26, 36 in recesses 11, 12 facilitates disposing and molding the manifold sealing members 26, 36. Furthermore, displacing the lips 26B, 36B to either side by the distance L makes the structure capable of receiving reaction force of the manifold sealing members 26, 36 more firmly.

That is, in the above-described embodiments in which the supporting portions 9 of one separator 3 is larger than the supporting portions 10 of the other separator 4 in each single cell C, the larger supporting portions 10 are bent to a great extent in the center parts by reaction force of the manifold sealing members 26, 36. To avoid this, the position of the lips 26B, 36B are displaced to either side, i.e. off-center of the larger supporting portions 10. This reduces the degree of distortion of the supporting portions 10 and makes it possible to receive reaction force of the manifold sealing members 26, 36 more firmly.

FIG. 9A to FIG. 9D illustrate the arrangement of the supporting portions in an inlet/outlet of a manifold hole of a separator. In the separator 3 in FIG. 9A, ribs of supporting portions 9 are continuously formed around the manifold hole H3, and a plurality of embossed round supporting portions 9 are arranged in the inlet/outlet of the manifold hole H3.

Figure 9A:
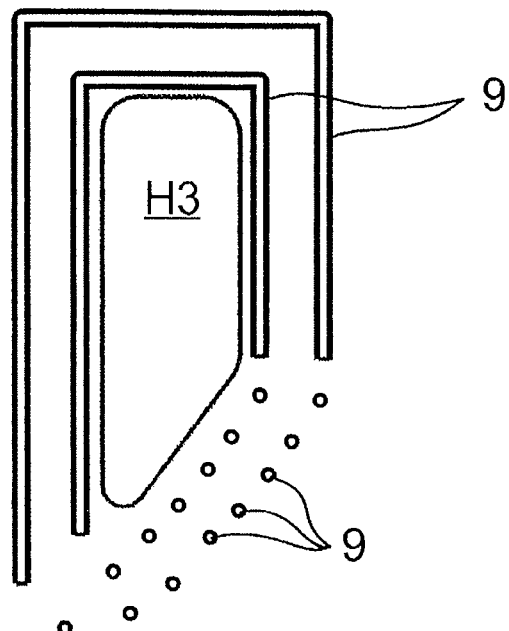
FIG. 9A to FIG. 9D are plan views respectively illustrating four examples of the arrangement of supporting portions around an inlet/outlet of a manifold hole.
Figure 9B:
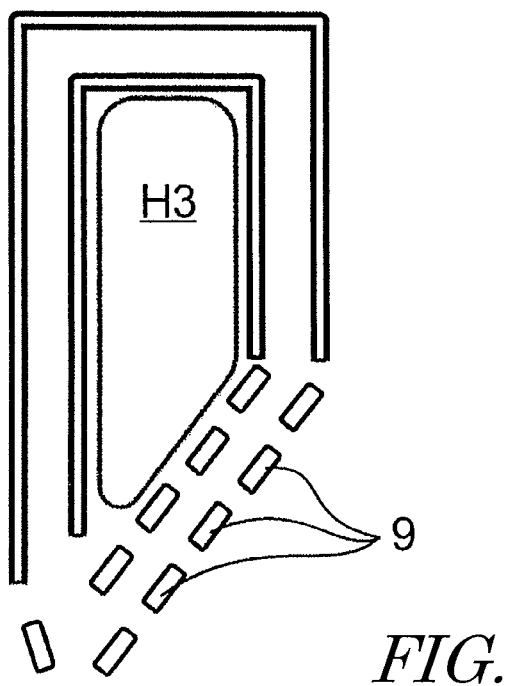
Figure 9C:
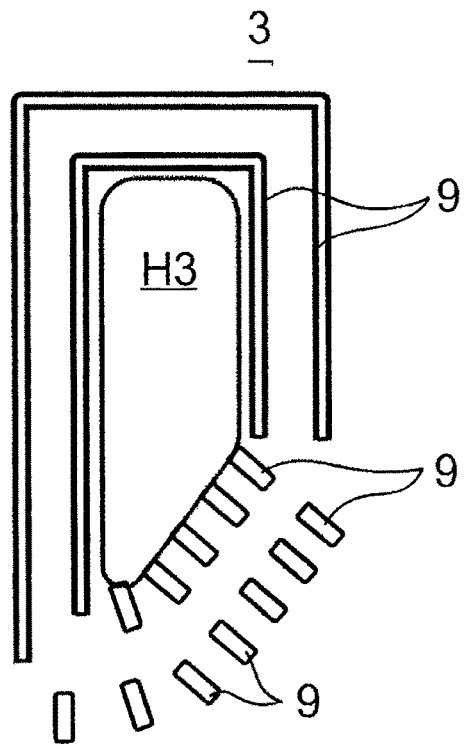
Figure 9D:
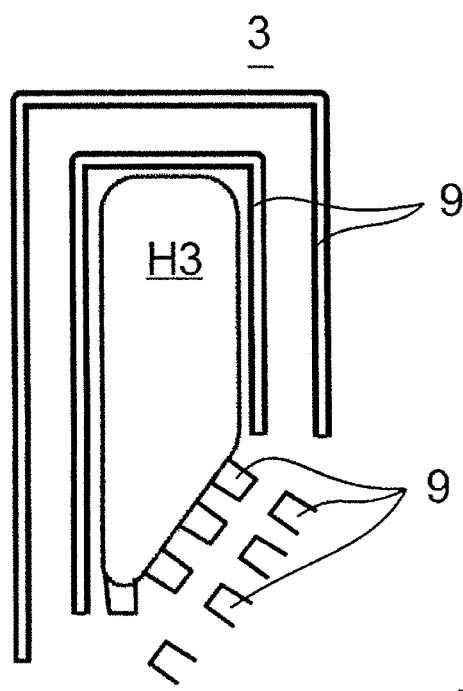

In the separator 3 in FIG. 9B and FIG. 9C, ribs of the supporting portions 9 are continuously formed around the manifold hole H3, and a plurality of embossed rectangular supporting portions 9 are arranged in the inlet/outlet of the manifold hole H3. The supporting portions 9 in FIG. 9B are oriented such that the short sides are parallel to the flow direction in the inlet/outlet, and they are staggered with respect to the flow direction. The rectangular supporting portions 9 in FIG. 9C are oriented such that the long sides are parallel to the flow direction in the inlet/outlet, In the separator 3 in FIG. 9D, ribs of the supporting portions 9 are continuously formed around the manifold hole H3, and a plurality of embossed supporting portions 9 with an inclined tip are arranged in the inlet/outlet of the manifold hole H3.

As described above, a variety of shapes and arrangements are possible with regard to the supporting portions 9 (10), and other shapes and arrangements are also possible in addition to the above-described examples. Such supporting portions 9 (10) can provide the same functions and advantageous effects as the previously-described embodiments.

The configuration of the fuel cell stack of the present invention is not limited to the above-described embodiments. The details of the configuration can be changed, or the configurations of the above-described embodiments can be suitably combined without departing from the features of the present invention.

REFERENCE SINGS LIST

C Single cell
FS Fuel cell stack
H1 to H6 Manifold hole

M Cell module
p Sealing plate
SL Sealing line (Sealing member)
W Overlapped portion
Zd, Zu Supporting surface
1 Frame
2 Membrane electrode assembly
3 One separator
4 Other separator
6, 16, 26, 36, 46, 56 Manifold sealing member (sealing member)
7 Base surface
8 Top surface
9, 10 Supporting portion

The invention claimed is:

1. A fuel cell stack, comprising:
a stacked plurality of single cells each comprising a frame supporting a periphery of a membrane electrode assembly and a pair of separators holding the frame therebetween; and
a sealing member disposed between the plurality of single cells,
wherein the pair of separators comprises respective supporting portions which are in contact with the frame, in which a sealing member is disposed on one of the supporting portions, a supporting portion of one separator has a different size from a supporting portion of the other separator,
an overlapped portion is formed in which a base surface where the supporting portion of one separator is in contact with the frame is overlapped with a top surface where the supporting portion of the other separator is in contact with the frame in a stacking direction, and
the overlapped portion receives and transmits reaction force of the sealing member between the single cells.

2. The fuel cell stack according to claim 1,
wherein the frame and the pair of separators have respective manifold holes that communicate with each other in a stacked state, and
the sealing member seals peripheries of the manifold holes in addition to a gap between the single cells.

3. The fuel cell stack according to claim 1, wherein the separators have front and back faces with mutually reversed shapes.

4. The fuel cell stack according to claim 1, wherein the frame is constituted by a thin film member.

5. The fuel cell stack according to claim 4, wherein the thin film member is made of film.

6. The fuel cell stack according to claim 1, comprising:
a plurality of cell modules each composed of the plurality of single cells; and
a sealing plate that is intervened between the plurality of cell modules and comprises a sealing member.

7. The fuel cell stack according to claim 6, wherein the sealing plate intervened between the plurality of cell modules comprises a supporting surface that is in contact with the separators to receive and transmit a force from the supporting portions.

8. The fuel cell stack according to claim 6, wherein the sealing member of the sealing plate intervened between the plurality of cell modules seals a periphery of a manifold hole that communicates with manifold holes of the frame and the pair of separators in a stacked state.

9. The fuel cell stack according to claim 2, wherein the separators have front and back faces with mutually reversed shapes.

10. The fuel cell stack according to claim 2, wherein the frame is constituted by a thin film member.

11. The fuel cell stack according to claim 7, wherein the sealing member of the sealing plate intervened between the plurality of cell modules seals a periphery of a manifold hole that communicates with manifold holes of the frame and the pair of separators in a stacked state.

* * * * *